United States Patent
Kimura et al.

(10) Patent No.: US 6,816,951 B2
(45) Date of Patent: Nov. 9, 2004

(54) REMOTE MIRRORING WITH WRITE ORDERING SEQUENCE GENERATORS

(75) Inventors: Takahisa Kimura, Tokyo (JP); Keiichi Kaiya, Tokyo (JP); Shigeru Kishiro, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 341 days.

(21) Appl. No.: 10/150,477

(22) Filed: May 17, 2002

(65) Prior Publication Data

US 2003/0105934 A1 Jun. 5, 2003

(30) Foreign Application Priority Data

Nov. 30, 2001  (JP) ....................................... 2001-365537

(51) Int. Cl.$^7$ ............................................. G06F 12/00
(52) U.S. Cl. .......................... 711/162; 711/167; 714/6; 709/217
(58) Field of Search ............................... 711/162, 167; 714/6; 709/217, 219

(56) References Cited

U.S. PATENT DOCUMENTS

| | | | | |
|---|---|---|---|---|
| 5,155,845 A | * | 10/1992 | Beal et al. ..................... | 714/6 |
| 5,615,329 A | * | 3/1997 | Kern et al. ..................... | 714/6 |
| 5,742,792 A | * | 4/1998 | Yanai et al. ................. | 711/162 |
| 5,889,935 A | * | 3/1999 | Ofek et al. .................... | 714/6 |
| 5,901,327 A | * | 5/1999 | Ofek .............................. | 710/5 |
| 6,044,444 A | * | 3/2000 | Ofek .......................... | 711/162 |
| 6,052,797 A | * | 4/2000 | Ofek et al. .................... | 714/6 |
| 6,173,377 B1 | * | 1/2001 | Yanai et al. ................. | 711/162 |
| 6,502,205 B1 | * | 12/2002 | Yanai et al. .................... | 714/7 |
| 6,658,540 B1 | * | 12/2003 | Sicola et al. ................ | 711/162 |
| 2004/0073831 A1 | * | 4/2004 | Yanai et al. .................... | 714/7 |

* cited by examiner

Primary Examiner—Kevin Verbrugge
(74) Attorney, Agent, or Firm—Townsend and Townsend and Crew LLP

(57) ABSTRACT

A storage system and method are provided and feature a highly available remote copying function and site switching capability. A redundant constitution to a sequencing generator for producing sequence information is provided. In a remote copy configuration, a sequence generator is provided at the copy destination site, in addition to the copy source site. The sequence generators are configured for redundant operation for site switching.

21 Claims, 13 Drawing Sheets

REMOTE MIRRORING WITH WRITE ORDERING SEQUENCE GENERATORS

CROSS-REFERENCES TO RELATED APPLICATIONS

This application is related to and claims priority from Japanese Patent Application No. 2001-365537, filed on Nov. 30, 2001.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates generally to information storage systems and in particular to an information storage system having the function of mirroring, or copying, from an information storage system (hereinafter "copy source site") comprising a plurality of information storage devices to an information storage system (hereinafter "copy destination site") comprising one or more information storage devices.

An information storage system typically comprises a plurality of information storage devices in order to improve the response time for requests from host devices such as host computers and to expedite the storage of information. Data stored in an information storage system are processed in a way as to be copied to another information storage system for the maintenance and management thereof.

In a "synchronous copying" environment, when a host device such as a server or other similar host computer issues a write request to a copy source site, the data is written to a copy destination site before the write request completes on the host device. This technique assures a high level of data currency for the host device. At any point in time, the copy source site will have the exact same data as the copy destination site.

However, because of objects such as reducing the waiting time for the host devices and information storage devices of the copy source site, a method is proposed wherein the writing of data to the copy destination site is performed without relation to the writing of new data to the copy source site. Such a method is called "asynchronous copying."

In the case of performing this type of asynchronous copying process, however, the copy destination information storage devices cannot determine the sequence in which to write if the sequence in which the write requests from the host devices is not known at the copy source. This is a result of the following situation. Because of dispersion or the like in the amount of data in the input instructions issued from the host devices and the capacities of the information storage devices receiving that data, the progress of processing in the information storage devices of the copy source site varies. Consequently, the sequence of write requests issued from the copy source site to the copy destination site may not be the same as the sequence of write requests issued from the host devices to the copy source site.

A function for appending the time at which the write requests were issued from the host devices to each write request (a "time stamp") was developed to retain the sequence of write requests. This function is realized as an operating function of the host devices and with this time stamp, each of the information storage devices connected to the host devices acquires mutual confirmation from communication among the information storage devices regarding the time by which ends the writing received from the host devices, while also becoming able to advance the writing process.

An IBM Sysplex timer (IBM 9037) adds such a function to the mainframe that is the host device. Time stamp information for a write instruction can also be performed by the information storage device that received the instruction. It is known that the information storage device gives a time stamp using an internal clock, or the information storage device gives a time stamp using a time server, e.g., GPS (global positioning system), an internal clock of a remote operating device, or some similar device.

By applying a time stamp in this way and transferring data to be copied from the copy source site to the copy destination site, it becomes possible to recognize the order in which the data should be written to the copy destination site.

On the other hand, in order to recover from a fault in the copy source site, it is necessary to know the time up to which the writing process completed successfully. The copy source information storage devices mutually inquire how far along the processing was completed and mutually confirm the progress of the writing process. This type of mutual confirmation is called synchronization among the information storage devices.

In the field of information storage systems as discussed above, technology is also known for copying information to a system configured with separate information storage devices to protect against a fault occurring in any part of the information storage system, or a disaster or the like.

In recent years, it has been proposed to constitute storage systems of the copy destination sites also with a plurality of information storage devices to improve the response capacity for requests from a copy source information storage device and to contrive expediency in the application of stored information.

In the copy destination site, the order of writing is controlled with consciousness of the data sent from the copy source site and the order in which that writing occurred.

Further, the copy destination information storage devices also communicate with each other and carry on the writing process while making reference to the time stamp relating to the write request obtained from the copy source information storage device and synchronizing the writing process with the time to which the writing has been completed.

However, in the case where there is only one timer or the like constituting the means for acquiring the data reception order from the host device, it becomes impossible to sustain the operation to retain synchronization among the plurality of information storage devices, in the copy source site or in the copy destination site, when provisioning of the data reception time, the data reception sequence information, and so forth are suspended for some reason.

Another issue arises when the copy destination site is an information storage system comprising a plurality of information storage devices of sufficient capacity to serve as a copy source site as well. Copying among such information storage systems configured with a plurality of information storage devices is called M-to-N remote copying.

For example, another constitution considered makes possible utilization of those resources as a copy source site, and not simply as a copy destination site. This is generally called site switching, and includes making these resources available for maintenance of the copy source site, expediency in operations, or using the copy destination site as a new copy source site in the case of some fault occurring in the copy source site.

However, sufficient examination has not been made relating to M-to-N remote copying, and to this type of site switching. It is not possible to carry out site switching with the currently proposed devices connected with simple bi-directional channels.

SUMMARY OF THE INVENTION

A method and system for an information storage system comprising a plurality of storage devices receiving write requests from a plurality of host devices includes a redundant sequence generator arrangement for producing sequence information. The sequence information is associated with the write requests provide data recovery for data failures. In accordance with one aspect of the invention, a single-site configuration includes two or more sequence generators. In accordance with another aspect of the invention, a dual-site configuration includes two (or more) sequence generators distributed across the dual sites. In accordance with still another aspect of the invention, a sequence generator is provided internal to the information storage system.

BRIEF DESCRIPTION OF THE DRAWINGS

The teachings of the present invention can be readily understood by considering the following detailed description in conjunction with the accompanying drawings.

DESCRIPTION OF THE SPECIFIC EMBODIMENTS

Figure 1:
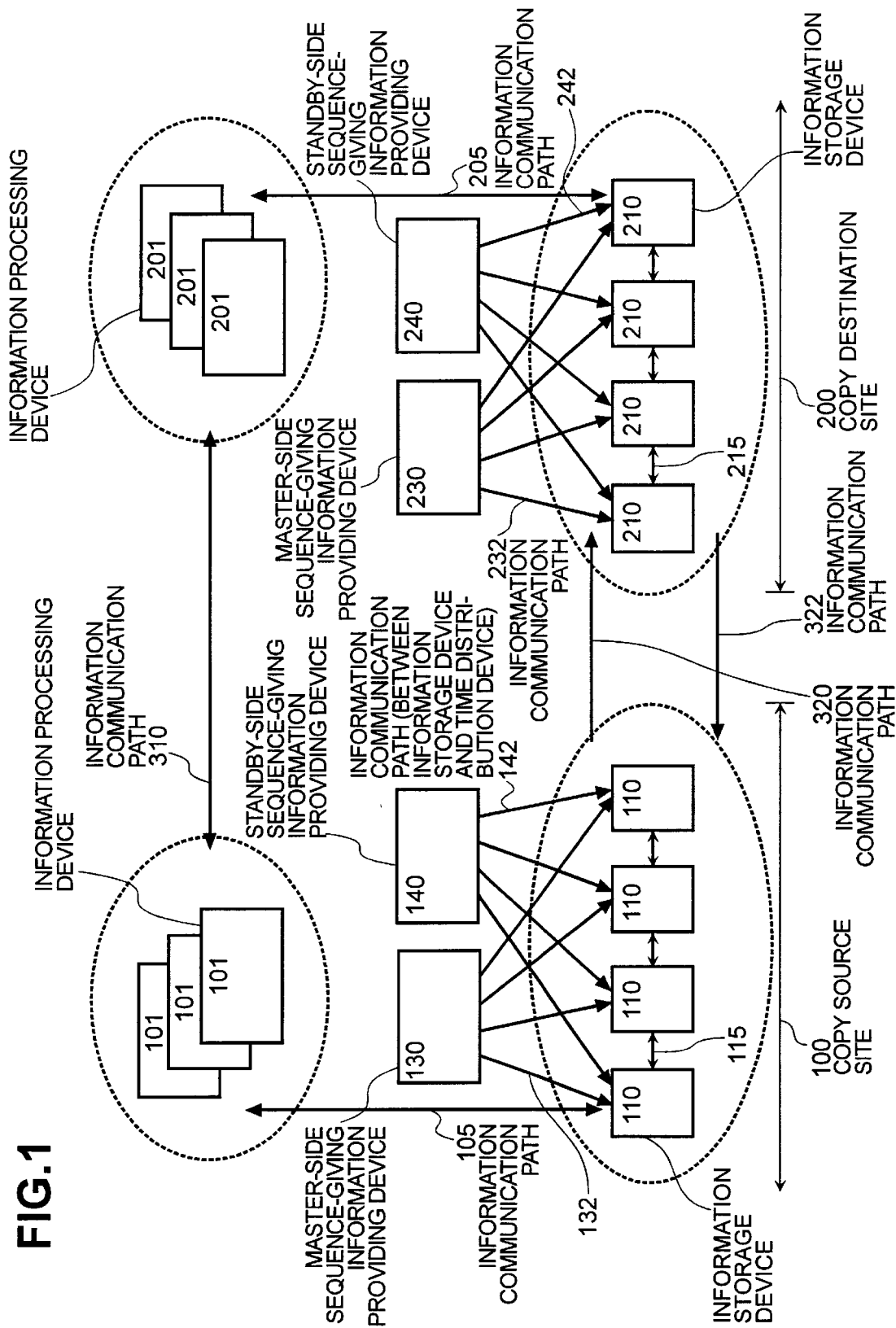
FIG. 1 is a drawing showing the flow of information in accordance with embodiments of the present invention.

An introductory discussion of the various embodiments of the invention is provided. This is followed by a more detailed discussion of specific embodiments according to the present invention.

In order to resolve the problems discussed above, an information storage system according to an embodiment of the present invention comprises: first means for providing sequence information and second means for providing sequence information to produce sequence information used to distinguish the sequence in which write requests are issued from host devices to information storage devices; and wherein the first means for providing sequence information (hereinafter "sequencing means", but also referred to in the drawings as "sequence-giving information providing devices") and the second sequencing means operate independently of each other. Specifically, the first sequencing means and second sequencing means provide sequence information to the information storage devices through separate routes. The information storage devices then use that sequence information to establish a sequence order of write requests received from the host devices.

In order to resolve the problems discussed above, defining means for defining either one of the first and second sequencing means as a master sequencing means is established. The information storage system can determine which sequencing means to use in acquiring the issuing sequence of the write requests and enables a redundant constitution without competition between the first sequencing means and second sequencing means.

This particular embodiment further comprises determining means for determining whether it is possible to provide sequence information to the information storage devices from the first sequencing means. The defining means redefines the second sequencing means as the master sequencing means when determination results from the determining means indicate that the provisioning of sequence information is not possible from the first sequencing means.

Meanwhile, when the acquisition of sequence information from the sequencing means is not possible, the information storage devices, having confirmed that the provisioning of sequence information was not successful, do not perform the constituent write operations to store the data associated with the write requests, in order for there to be no loss of reliability of the data stored in those information storage devices.

Furthermore, so as not to perform write operations to the storage media for the write requests from the host devices, the information storage devices, having confirmed that provisioning of sequence information was not successful, make notification to that effect to the other information storage devices constituting the information storage system. By giving notification not to perform write operations to storage media under the lead of the information storage devices in this way, it becomes possible to match the awareness of all the information storage devices without influence from the states of external devices.

Furthermore, it becomes possible to restart operations in the state where use of the sequence information is resumed, when cancellation of the state (wherein write requests from host devices are not executed) is triggered by a notification from the sequencing means that it has been redefined as the master.

Furthermore, in order to realize a remote copying system with an M-to-N constitution, communication means for carrying out communication among the information storage devices which constitute each of the information storage sites are established and configured to make possible bi-directional communication so that sequence information can be provided to any site from the sequencing means.

Also, a determining means is established for determining whether the sequencing means established in each site is able to provide sequence information successfully. When it is detected that the provisioning of sequence information is not possible, the determining means will cause the handover of that operation to the sequencing means connected to another site.

Furthermore, a time adjusting skew portion is provided for the case when the sequencing means and the destination device that receives the sequence information are some distance apart.

Furthermore, the timer value in local memory is corrected on the basis of the sequence information attained from the sequencing means, in the case where sequence information is provided by the information storage device itself using a self-advancing timer which is counted by the clock of the processor itself within the information storage device and local memory of the processor itself for storing timer values counted by this self-advancing timer.

Following, a more detailed discussion of various illustrative examples according to embodiments of the present invention is presented in conjunction with the drawings.

Figure 6:
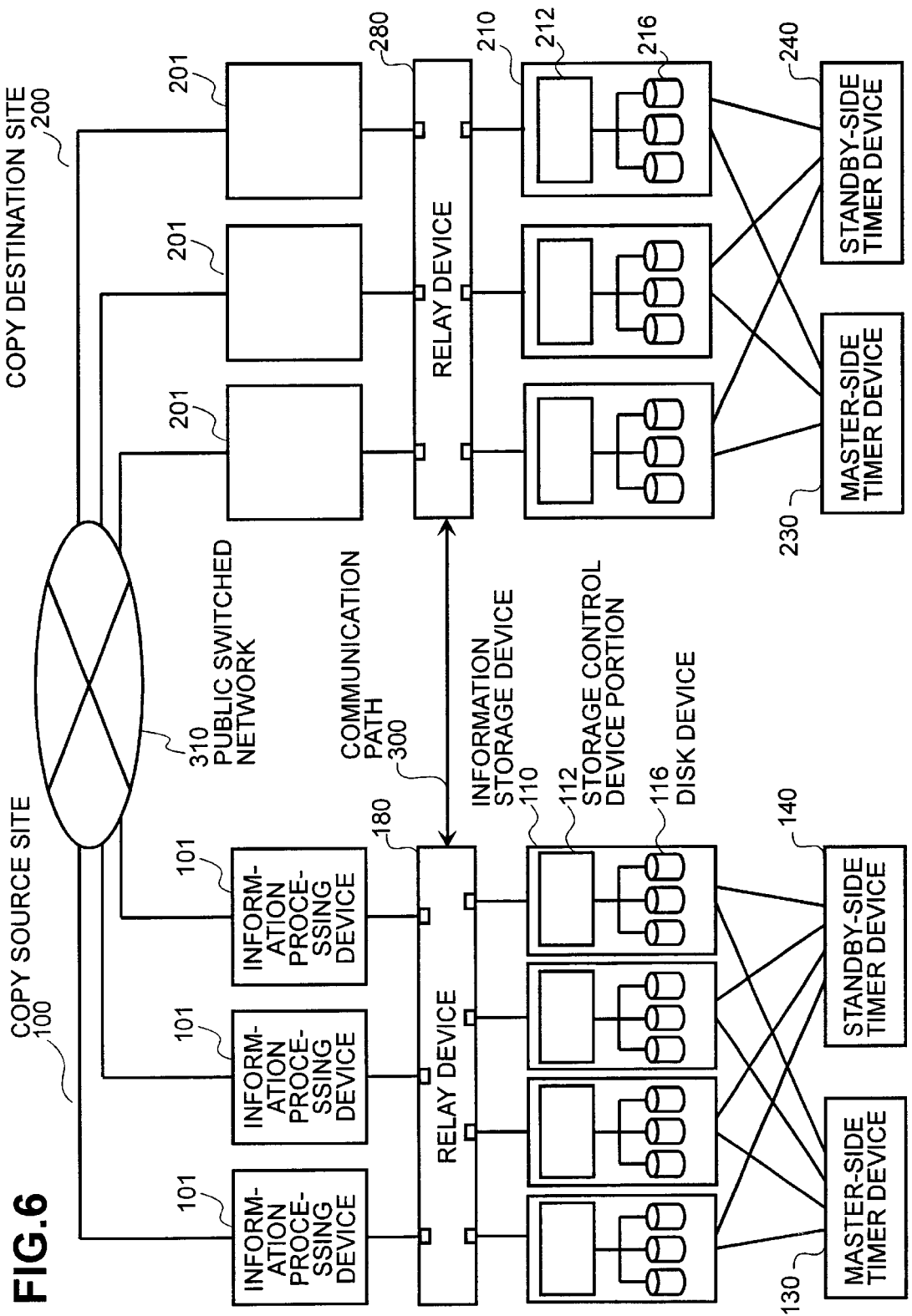
FIG. 6 is a drawing showing a constitution example of the storage system in accordance with embodiments of the present invention.

FIG. 6 is a drawing showing one example of the hardware constitution of the copy source site 100 and copy destination site 200 in accordance with embodiments of the present invention. The copy source site 100 and copy destination site 200 have a bi-directional connection through the communication path 300.

This connection may be made through a direct cable or made using a public switched network. The copy source site 100 is comprised of a plurality of information processing devices 101 and a plurality of information storage devices 110. The information processing devices 101 are host devices for issuing write or read requests to the information storage devices 110; and the information processing devices 101 are connected with the information storage devices 110, which are lower level devices, through a relay device 180. In this drawing, the explanation will be made in relation to the state where the devices are connected via a relay device 180, but these devices can also be connected directly with a cable.

The information storage devices 110 comprise disk devices 116 which are recording media for writing data, for which there was a writing instruction from the information processing devices 101, and a storage control device portion 112 for controlling the writing and reading to the disk devices 116.

A plurality of control processors, not shown, for controlling the disk devices 116 and the transfer of information and so forth among the information storage devices 110 is established in the storage control device portion 112. The timer devices 130 and 140 are established independently of each other. The timer devices are suited for use as sequence generators ("sequencing means") to provide sequence information to the information storage device 110.

Either timer device 130 and 140 can be used as a master side timer device ("master sequencer"). The figure shows a configuration wherein the timer device 130 is the master and the timer device 140 is the standby. In the case where a fault occurs in the master side timer device, the remaining standby side timer device 140 can be used as the master timer device. The master side timer device 130 and standby side timer device 140 are configured so as to have redundancy to be able to communicate on mutually different lines as shown. In the present embodiment, the master side timer device 130 and standby side timer device 140 are each connected directly with the information storage device 110, but these can also be connected through a relay device 180.

The copy destination site 200 is configured in the same way as the copy source site. Of course, the copy destination site storage system can be appropriately modified with varying numbers of information storage devices 210 and information processing devices 201 from the perspectives of expediency in operations and cost-effectiveness. Also, the information processing devices 101 and the information processing devices 201 are connected through a switched network 310 so as to be able to communicate with each other. If part of any type of network, this switched network may be point-to-point or a large-scale WAN using a public switched network.

On the other hand, in this drawing, the explanation concerns the state wherein the information processing devices 101 and information storage devices 110 are connected using a relay device comprising a switching hub or the like. However, these connection means may also further connect the devices through a public switched network between remote locations through repeaters such as hub or wavelength multiplex dividing devices, bridge such as switching hubs, or routers, for example. Meanwhile, various communications protocols for these can be selected according to the switched network specifications and so forth, in addition to SCSI, and fibre channel; and multiprotocol communications through a gateway can also be employed.

Moreover, a loop (i.e., communication in a serial fashion) or star-shaped connection mode (i.e., broadcast fashion) using the communication relay device 180 can be used in communications among the information storage devices 110. Of course, the loop or star-shaped connection mode is also possible by wiring with a direct cable. In the case of using the loop connection mode, it becomes possible to transfer information to the adjacent information storage device 110. In that case, the information storage device 110 which initiated the information transfer can detect that the information has been transferred to all of the other information storage devices 110 when the first device 110 receives the very information that it initiated. Also, in this case, when a communication fault or the like has occurred in one direction around the circle, communication redundancy can be ensured by switching to the reverse communication direction around the circle.

Figure 2:
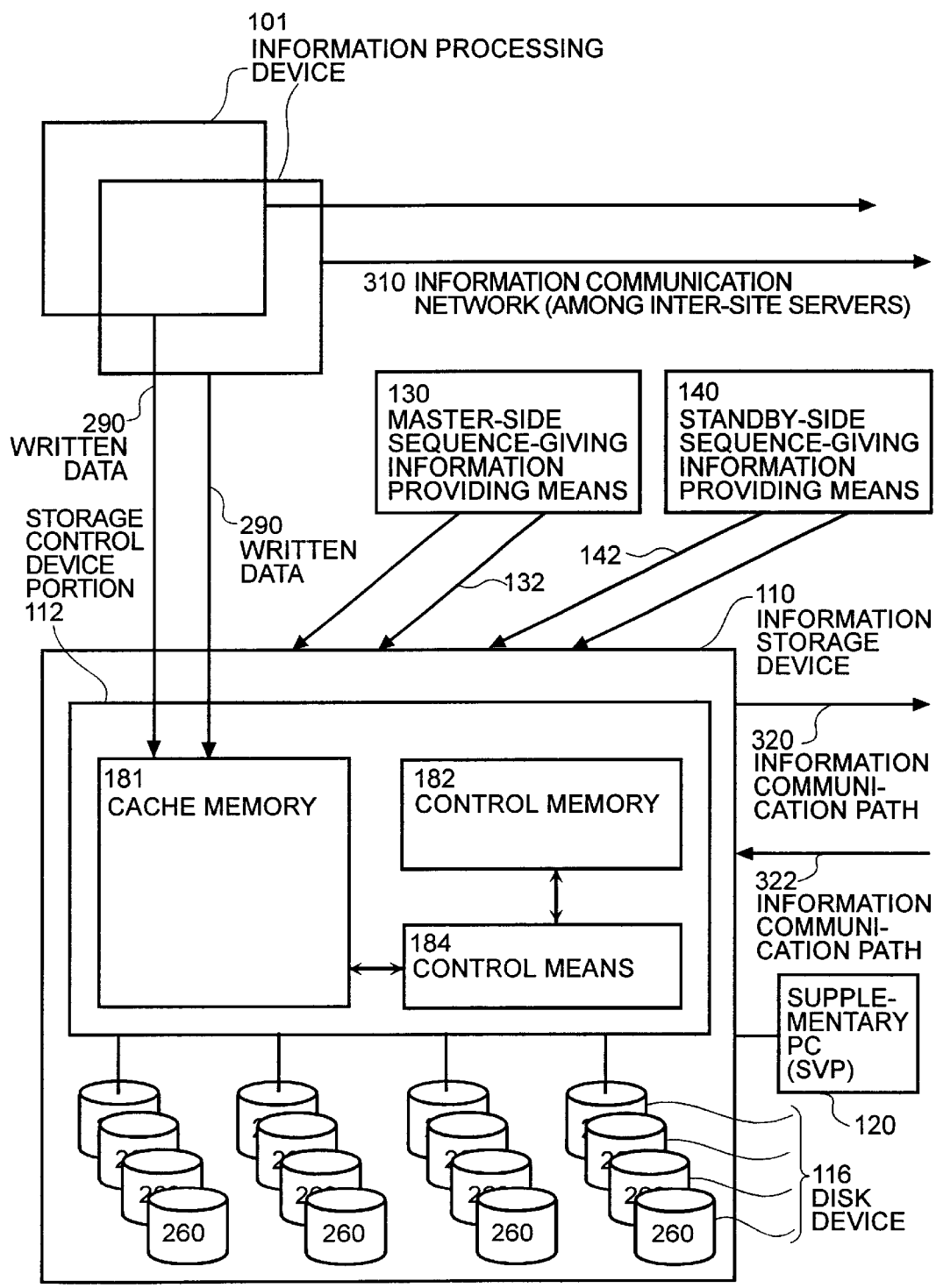
FIG. 2 is a drawing showing the flow of the information in the information storage devices in accordance with embodiments of the present invention.

FIG. 1 shows an outline of the information flow in the information storage system in accordance with embodiments of the present invention. FIG. 2 is a drawing showing a detail of the information flow shown in FIG. 1, particularly the information flow between the information processing devices 101 and information storage devices 110. In FIG. 1, a plurality of information storage devices 110 receive data input/output (I/O) instructions from the information processing devices 101 which constitute the host devices. The I/O instructions are transferred across the information communication path 105 and control the writing and reading of data to and from the information storage media (e.g., magnetic disks) which constitute the information storage devices 110.

An information storage device 110 includes a storage control device portion 112 and disk devices 116 which are information storage media, as shown in FIG. 2. The storage control device portion 112 temporarily records write data from the information processing devices 101 to the cache memory 181, and controls the writing of information to the disk devices 116 with control means 184, comprising microprocessors or the like, on the basis of control information stored in the control memory 182.

Also, the supplementary PC 120 shown in FIG. 2 can be realized with an information processing device such as a personal computer and is used to set the management information for the storage control device portion 112 and to display the state of the storage control device portion 112. If the information processing devices 101 are information processing devices for performing information processing, they can be personal computers for personal use or can be large-scale, general purpose computers or servers. Also, the disk devices 116 are recording media such as magnetic disks, or magnetic tape or semiconductors. The storage media 116 may also have a RAID constitution.

The plurality of information storage devices 110 are connected so as to be able to take sequence information through information communication paths 132, 142 from each of two or more sequencing means 130, 140 (shown in the figure as "sequence-giving information providing devices"). These sequencing means can include with timers as shown in FIG. 1. The sequencing means can take information from another separate counter means from outside the system and provide sequence information as discussed below.

The information from the sequencing means 130, 140 is used in order for the information storage devices 110 to acquire the time and sequence in which the data write requests were received from any of the information processing devices among the information processing devices 101. The sequencing means 130 and 140 can be realized by time acquiring means such as GPS or a timer in the sequencing means. In the case of a timer constitution, the sequencing means periodically generate the counter value with an incrementing counter and decrementing counter or the like and provide the counter value to the information storage devices 110. In the case of receiving an input instruction from any of the information processing devices 101, the information storage device 110 can attain information relating to the sequence of the input instructions from the host devices, such as the information processing devices 101, by using that timer value.

A minimum of two of these sequencing means 130 and 140 are established independently. One of the sequencing means (e.g., 130) is determined to be the master, to be used during normal operation, while the other sequencing means (i.e., 140) serves as a standby sequencing means. So long as the sequence information is received successfully, all of the information storage devices 110 acquire the sequence information from that sequencing means which has been designated as the master ("master sequencer"), in this case sequence means 130.

The information storage devices 110 communicate with each other, as shown by reference numeral 115 in FIG. 1, regarding the point up to which other information storage devices have processed a data write request from the information processing means 101 and confirm and recognize each other's processing state. This type of method for synchronization among the storage devices also includes a method wherein the information storage systems are connected together on a loop as discussed above wherein communication occurs in serial fashion with the adjacent information storage devices 110.

Also, apart from the master-side sequencing means 130 which is the master as shown in FIG. 2, the sequencing means 140 is defined as the standby-side sequencing means. When a fault occurs in the master-side sequencing means 130, or when a blockage or the like occurs in the information communication path 132, and the sequence information is not notified to the information storage devices 110, the standby-side sequencing means 140 is newly defined as the master and continues that operation through the information communication path 142. Another possible constitution is one wherein, in order for maintenance, checking, and so forth of the information storage system 100, an order for switching the master side and standby side is issued through the supplementary PC 120 and the standby side continues the operation as the new master sequencing means. For notification of the order for switching between master and standby from the PC 120, another possible constitution is to have a direct line between the sequencing means to make possible the notification of this order to both sequencing means.

However, there are times where a host device such as a server or host computer in the copy source site 100 cannot continue work because of a disaster or the like, or where it is necessary to exchange the roles of copy source site and copy destination site 200 ("site switching") because of the maintenance action thereof. In order to facilitate site switching, the copy source site information storage devices 110 and the copy destination site information storage device 210 should have bi-directional information transfer capability. FIG. 1 shows bi-directional communication paths 320 and 322 between the copy source site and the copy destination site. This connection can also be made with a direct cable, through any relay device 180, or using a public switched network. With an embodiment wherein this bi-directional data communication is provided, it is possible to logically define the information communication path in the reverse direction from the copy destination information storage device 210 to a copy source site information storage device 110 when it becomes necessary to switch the copy source site and copy destination site.

Any conventional or otherwise known communication protocol can be used for performing these transfers of information; e.g., TAG/BUS (parallel I/F), ESCON I/F (serial I/F) on a mainframe, or SCSI, fibre channel protocol (FCP), IP, or the like. Particularly in the inter-site information communication paths 320, 322, this may go through a LAN or WAN environment having a variety of communication backbones such as IP, as well as T3 and ATM.

However, it is not possible to realize site switching simply by establishing a communication path for this bi-directional information in this way. As discussed above, it is necessary to establish the sequencing means 230 and 240 (identified in the figures as "sequence-giving information providing" devices) in the copy destination site, in advance, in the case of switching between the copy source site and copy destination site. Each of the sequencing means 230, 240 and each of the information storage devices 210 shown in FIG. 1 provide sequence information through the information communication path 242 to the information storage devices 210, as in the copy source site.

Figure 11:
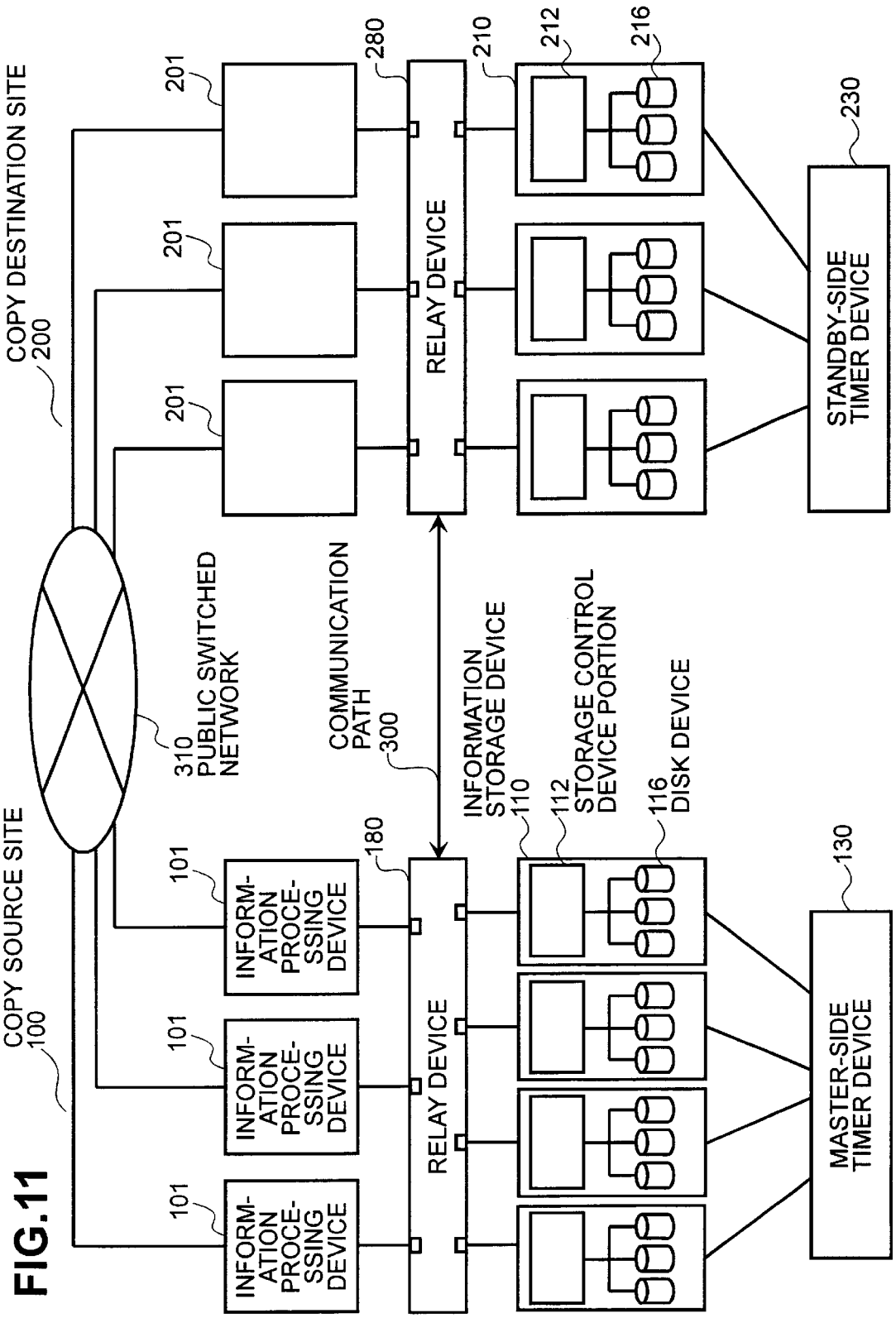
FIG. 11 is a drawing showing a sample constitution of the storage system in accordance with embodiments of the present invention.

In this switching of the copy source site 100 and copy destination site 200, specifically the site switching action, the sequencing means 130 on the copy source site does not require redundancy; i.e., a sequencing means 140 is not required. Similarly on the copy destination site, a redundant sequencing means 240 is not required. As can be seen in FIG. 11, sequencing means 130 and sequencing means 230 are established respectively for the copy source site 100 and the copy destination site 200. One of the sequencing means (e.g., 130) is configured as the master side sequencing means and the other sequencing means (e.g., 230) is the standby side sequencing means. Redundancy of the timer device is guaranteed, while costs are kept down and it also becomes possible to handle to site switching.

Figure 3:
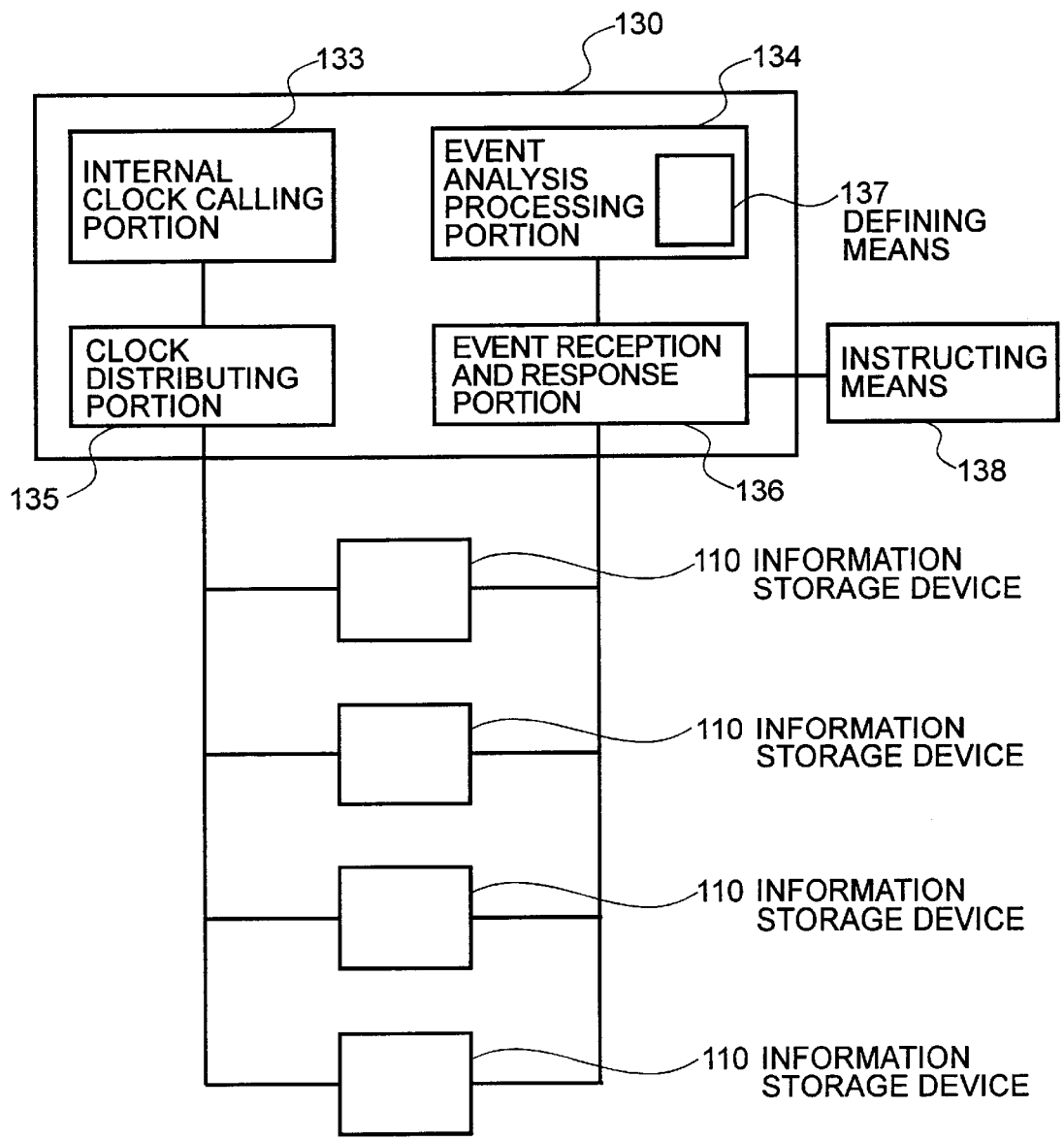
FIG. 3 is a drawing showing a constitution example of the means for providing sequence information in accordance with embodiments of the present invention.

FIG. 3 shows an example of a specific implementation of sequencing means 130 in accordance with an embodiment of the present invention. The sequencing means can be loaded as a function of general purpose hardware using software, or can be incorporated with an individual device. The sequencing means 130 shown in FIG. 3 distributes the clock sent by the internal clock calling portion 133 to the information storage devices 110 through the clock distributing portion 135. Specifically, there is a counter for counting the clock sent by the internal clock calling portion and the clock calling portion 135 distributes the counter value counted by that counter to the information storage devices 110.

The information storage devices 110 acquire the sequencing information in which write requests were received from the information processing device 101 by using this timer value. Also, the information storage device 110 side may be constituted so as to calculate the times at which events occur, such as writing reception or a fault, based on this timer value. In this case, the time at which each type of the event occurs can be provided as information which is easily understood by the user.

In FIG. 3, it can be seen that the clock value is distributed to the information storage devices 110 with the clock calling portion 133 within the sequencing means 130. However, the constitution can also have means for saving sequence information established in RAM in the sequencing means so that the information storage devices 110 read that value.

Figure 4:
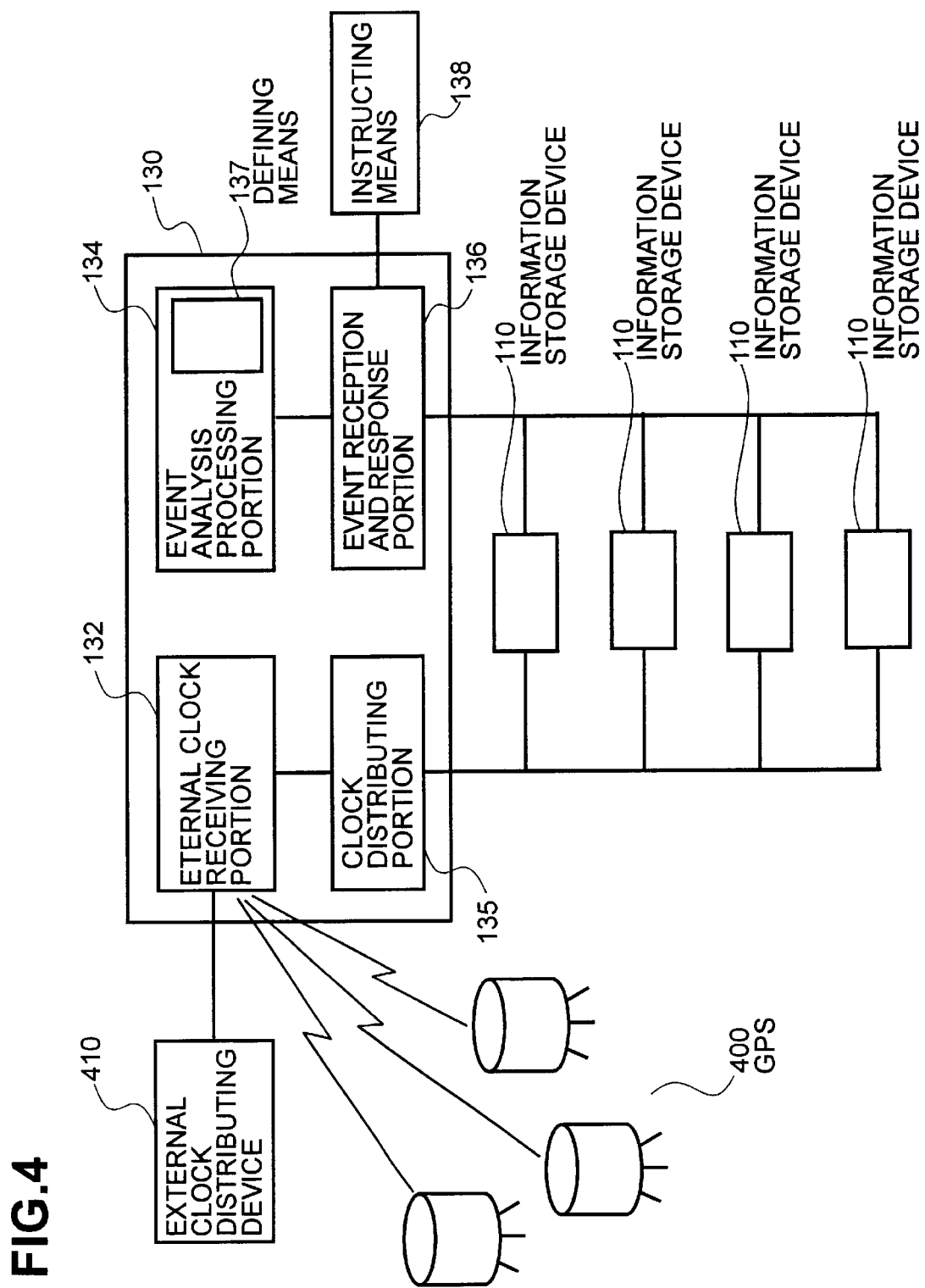
FIG. 4 is a drawing showing another constitution example of the means for providing sequence information in accordance with embodiments of the present invention.

As another method, the constitution can also be such that the clock is acquired from an external clock distributing device 410 as shown in FIG. 4. In this case, the clock acquired from the external clock is counted and that count value is distributed to the information storage devices 110 through the clock distributing portion 135. It is also possible to take up a time signal such as GPS 400 instead of the external clock distributing device 410.

The case of acquiring the clock information from the external clock distributing device 410 in FIG. 4 is explained in further detail. In the case of using GPS 400, the time information from GPS 400 is received by the external clock receiving portion 132. The external clock receiving portion 132 recognizes that time information received, carries out necessary conversion and time adjustment (skew), and acquires the necessary clock value or time information. On the other hand, in the case of acquiring the clock information by receiving it from the external clock distributing device 410 instead of clock information from GPS 400, a clock value from the external clock distributing means is received by the external clock receiving portion 132, which carries out the recognition, conversion, time adjustment (skew) and so forth, and acquires the necessary clock value or time information. Either the GPS 400 or external clock distributing device 410 in FIG. 4 can be used selectively, or may be disposed so that both can be used, so that the other external clock distributing device 410 is used when the GPS 400 cannot be used.

Another example of providing sequence information by the sequencing means 130 can be accomplished by finding the received clock information acquired from the external clock distributing device 410 and the precise current time from the internal clock or internally generated clock of the sequencing means 130 themselves. An adjusted clock value can be calculated with the addition of the adjustment value (skew value), taking into consideration of the distance between the information storage devices measured in advance, as the synchronizing time between the information storage devices. The synchronizing time can be passed through the clock distributing portion 135 and distributed to each of the information storage devices 110. The adjusted clock value compensates for timing differences between information storage devices which are separated by long distances.

Regarding the precision of the time in this case, the time information to be given is not required to be a precise time in the case where the objective is to carry out asynchronous remote copying while retaining the consistency of the written information. A time which can be expressed with a precision greater than the minimum time for a host device to execute a write instruction, and which can correspond to a time with a precision greater than the minimum time in which the information storage devices can process a single write instruction, is sufficient for use as the synchronizing time.

Also, instructing means 138, constituted with a computer having an operation panel, are connected with the sequencing means 130. The addition, removal, and so forth of various mechanisms inside the sequencing means 130 are carried out according to the instructing means 138. Using the screen of these instructing means 138, it becomes possible to acquire fault information, operating logs, and so forth for the sequencing means 130. The instructing means 138 may be attached to the device, but may also have a remote connection through a communications network such as a LAN. These instructing means 138 can also be realized in the constitution by common installation in the supplementary PC 120, shown in FIG. 1 and associated with the information storage devices 110.

Instructions from the operating panel of the instructing means 138 and notification from the information storage devices 110 to the sequencing means are received by the event receiving and responding portion 136. Processing in response to the instructions are executed with the event analysis and processing portion 134 and a response is made once more to the device that outputs the instruction or the device which should send the instruction through the event receiving and responding portion 136.

The main functions performed by the event receiving and responding portion 136 include a function for notifying the information storage devices 110 that the master side sequencing means 130 is replaced by the standby side sequencing means 140. When one of the storage devices 110 rejects a write request from one of the information processing devices 101 (referred to as "reject notification"). In such a situation, the event receiving and responding portion 136 will instruct the other information storage devices 110 to issue "reject notifications" to the information processing devices 101 as well.

In other words, the event analysis and processing portion 134 and event receiving and responding portion 136 issue orders relating to preparations to be made on the information storage device side when the master side sequencing means are switched with the standby side sequencing means. As explained earlier, in copying between information storage system sites, the sequence in which write requests were made by the host devices in the copy source site must be recognized in the copy destination site as well.

Consequently, it is necessary to control the individual information storage devices while ensuring the maintenance of a state wherein the sequence in which write requests were received from the host devices can be correctly provided. Accordingly, in the case of switching the sequencing means between the master side and standby side, and when performing site switching, the sequencing means that have become able to distribute sequence information take the lead and issue control orders to the individual information storage devices.

Of course, the abovementioned control orders are constituted so as to apply to any one of the information storage devices and can be constituted to be transmitted thereafter among the information storage devices 110. In any event, in order that provisioning of the sequence information is not suspended during the operation of the information storage devices, a sufficient constitution carries out the initiation and discontinuation of the operations with the trigger being the operation of the sequencing means. The transmission of the control orders is made through a relay device 180 in FIG. 6 and carried out within the same site, and is made through the communication path 300 in the case of information transfer from the copy source site 100 to the information storage devices of the copy destination site 200. Moreover, other sequencing means 140, 230, and 240 are constituted in the same way.

Figure 5:
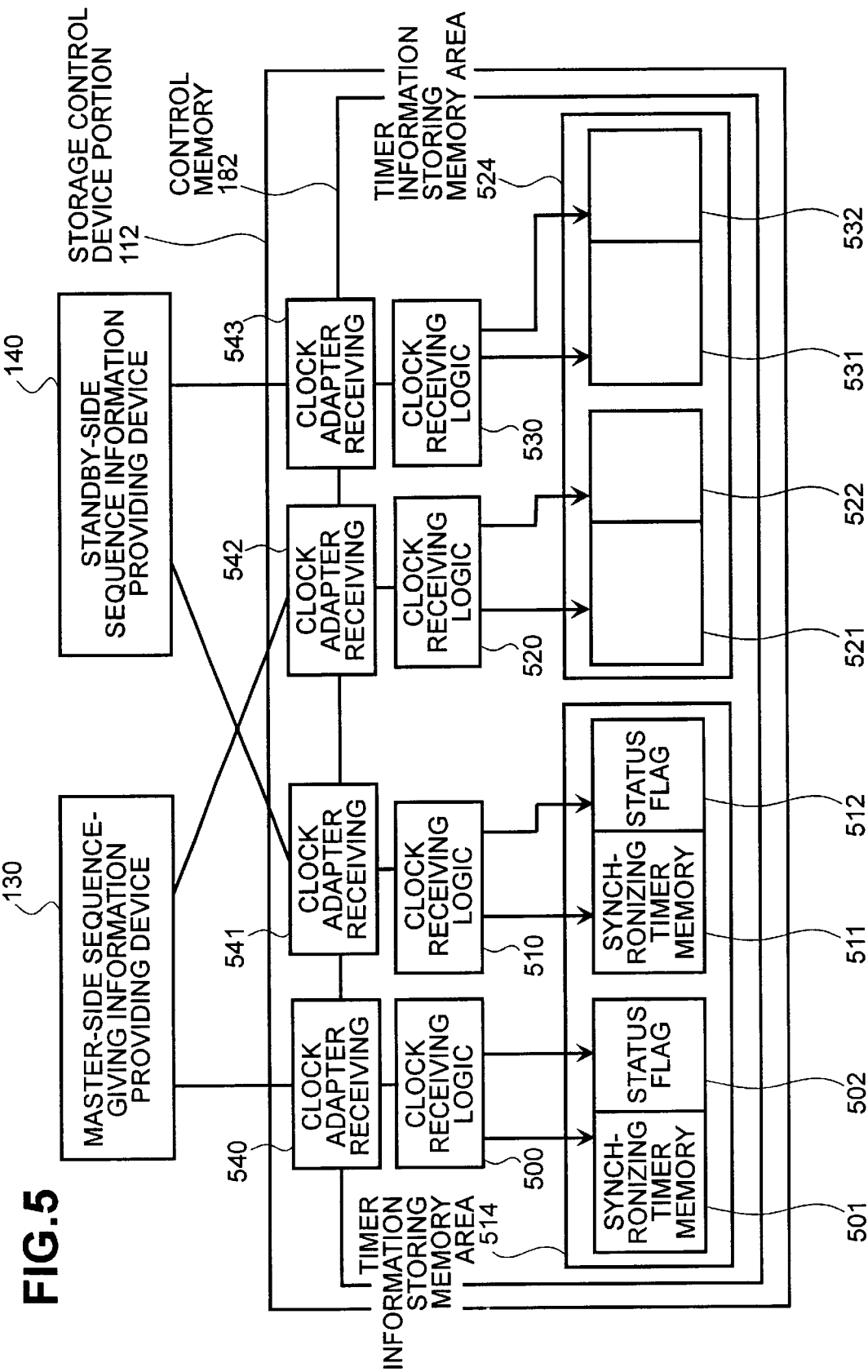
FIG. 5 is a drawing showing a detail of a constitution example of the clock receiving portion for taking information from the means for providing sequence information in accordance with embodiments of the present invention.

FIG. 5 is a drawing showing an example of the constitution of the information storage device 110 side, for receiving the sequence information provided by the sequencing means 130. Specifically, a clock signal is distributed from the clock distributing portion 135 of the sequencing means 138, and the clock receiving portion 500 in the information storage control device portion 112 receives that signal. The counter of the synchronous timer memory 501 in the timer information storage memory 514 is incremented based on the signal received, and if the counter is incremented successfully, a successful receipt is recorded in the status memory 502. In the present embodiment, the status memories 502, 512, 522, 532 are constituted with flags and are constituted to be set to OFF in the case of a successful completion and on in the case where a successful completion is not detected.

This sequence information from the master side sequencing means 130 is constituted so as to be received by a clock receiving portion 520 constituted separately from the clock receiving portion 500 and can provide redundancy to the acquisition of information from the master side sequencing means 130. This sequence information received by the clock receiving portion 500 and clock receiving portion 520 is stored in the synchronous timer memories 501 and 521 of the separate timer information storing memories 514 and 524, respectively. Likewise, the sequence information from the standby side sequencing means 140 is received by the clock receiving portion 510 and clock receiving portion 530, and stored in the separate synchronizing information storing memories 511, 531 respectively. As shown in FIG. 4, the sequence information obtained from the master side sequencing means 130 and the sequence information attained from the standby side sequencing means 140 is grouped, divided into two memory groups, and given separate constitutions in terms of the hardware. This secures redundancy.

Figure 14:
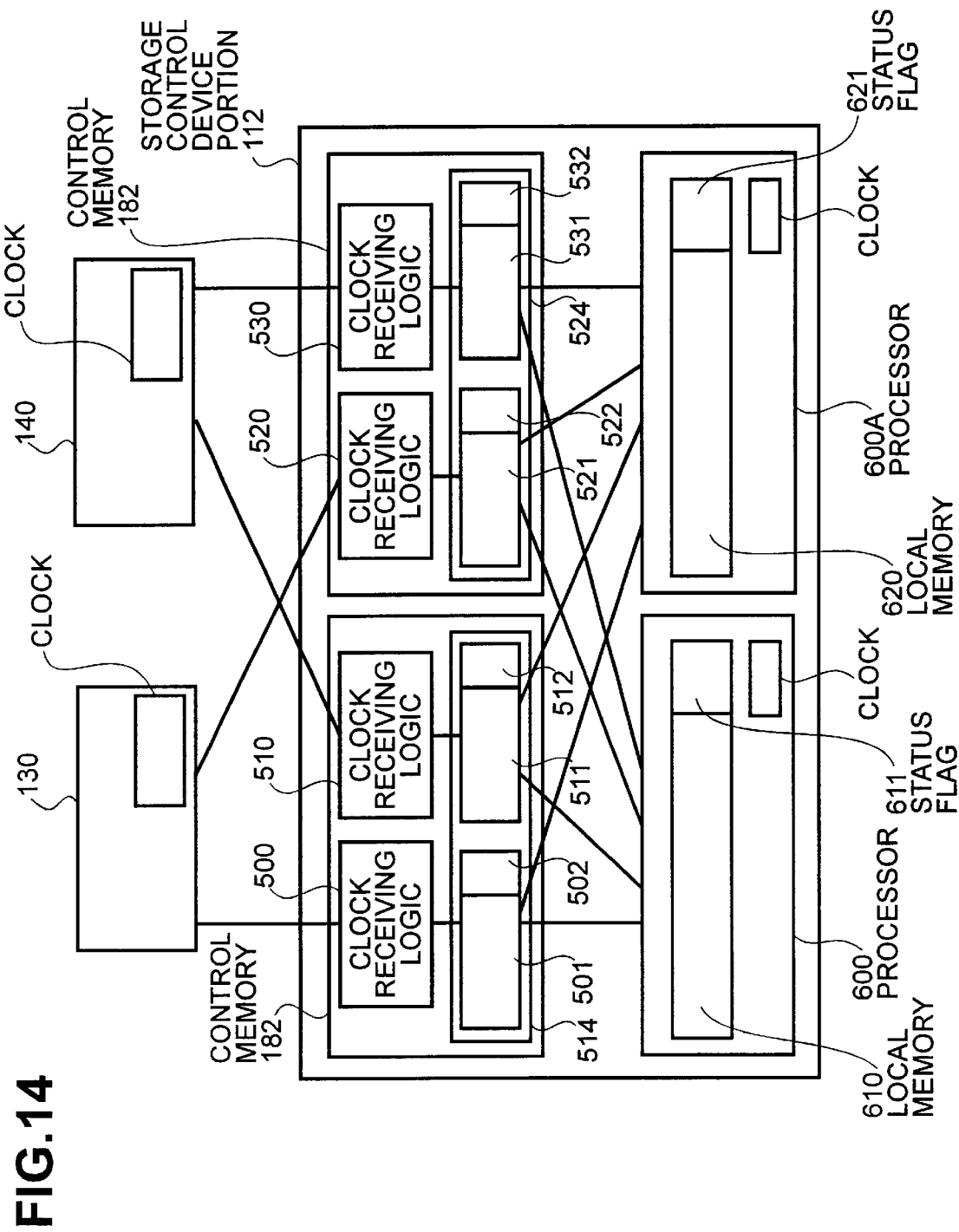
FIG. 14 is a drawing showing the constitution of the means for providing sequence information in accordance with embodiments of the present invention.

Still another embodiment of the present invention is explained using FIG. 14. The figure shows a constitution with processors 600 and 600A added to the constitution in FIG. 5 in order to respond to high-speed I/O requests from the host devices. A self-advancing timer generated by the clocks of these processors 600 and 600A themselves can be used as sequence information. In FIG. 14, this processor 600 is disposed within the storage control device portion 112.

The operation of the processor 600 is explained next. The self-advancing timer counted by the clock of the processor 600 is saved as a timer value in the local memory 610 of the processor 600 itself. Each information storage device 110 uses the timer value and associates the timer value with a write request from the information processing devices 101 as the sequence information. In this case, in order to maintain the precision of the timer, the synchronizing timer memory 501 in the timer information storage memory 514 is accessed periodically at the necessary minimum corresponding to the precision of the self-advancing timer, and the timer value is corrected.

Because the correct synchronizing timer from outside is saved in the synchronizing timer memory 501 as discussed below, that value is referenced and the timer value in the timer memory 610 is corrected. It thereby becomes possible to constitute a timer that can provide the sequence even for high-speed I/O requests.

In other words, the timer value can be saved in the local memory of the individual microprocessors. Through the use of that timer value by the information storage devices, the microprocessor 600 becomes able to minimize access to the memory outside the microprocessor shared by the other microprocessors and it becomes possible to improve the control speed.

Moreover, as shown by 611 in FIG. 14, it is also possible to provide access timing to the sequencing means through the further use of a status flag. In particular, it is read whether a specific bit in the counter is on or off and this can also be used as the flag.

Figure 7:
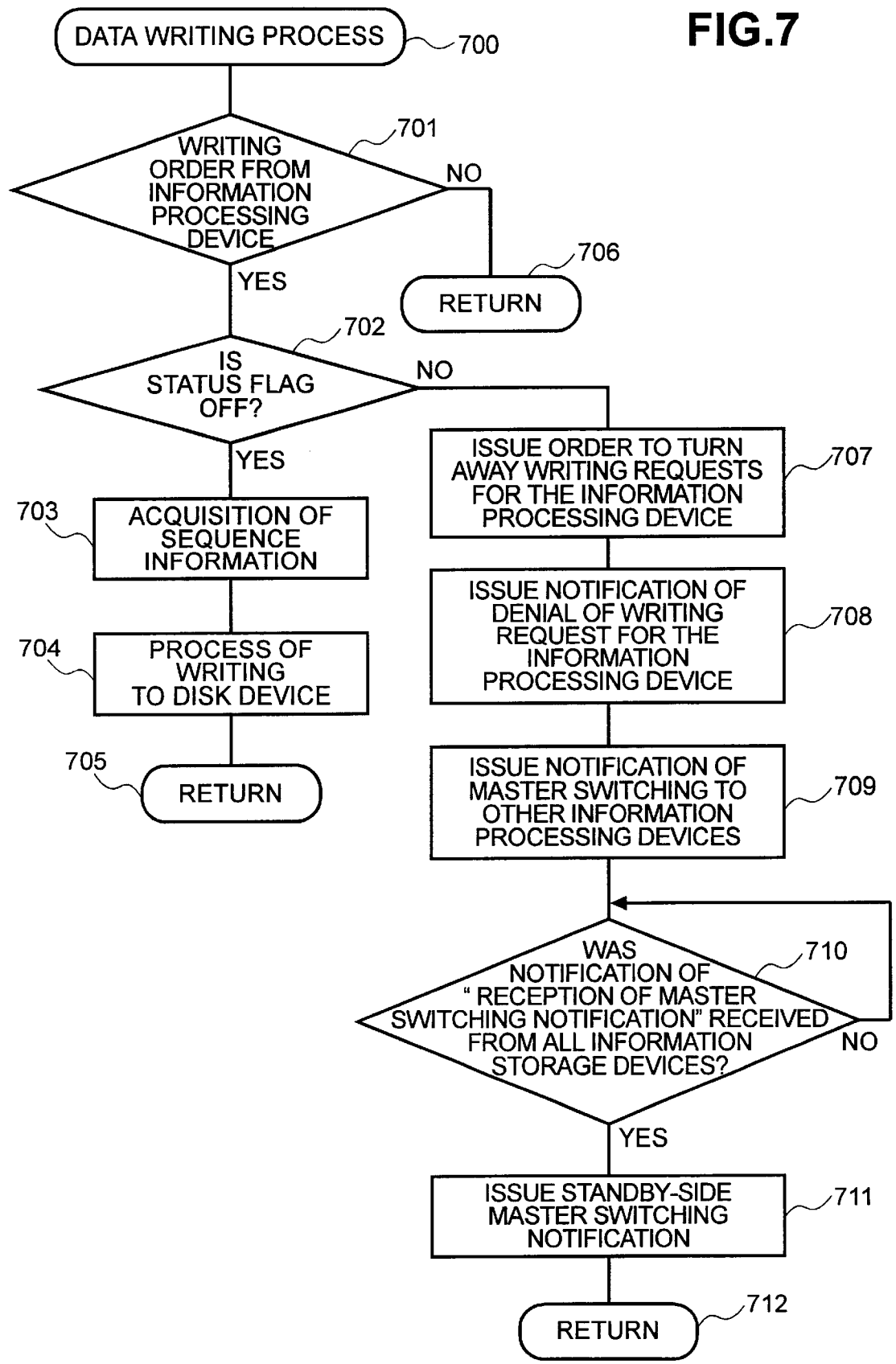
FIG. 7 is a flowchart showing the data writing process in accordance with embodiments of the present invention.

The procedure for switching the master side sequencing means 130 and standby side sequencing means 140, a principal element of the present invention, is explained next using a flowchart. FIG. 7 is a flowchart showing the procedure for the data writing processes of the information storage devices 110 in the case where there is a write request from the information processing devices 101.

The information storage devices 110 start the writing process when a write request is received from the information processing devices 101, and do not perform the processing when there is no write request. (Step 701, 706)

In the case where a write request is made to the information storage devices 110 from the information processing devices 101, the information storage devices 110 receive sequence information from the sequencing means 130, which is the current master side in the information storage devices 110, and determine the status flag of the synchronizing timer 502 shown in FIG. 5. (Steps 701–702)

This status flag is a flag showing whether the sequence information was attained successfully from the sequencing means 130 as discussed above. If the flag is OFF, that means the sequence information was attained successfully. The sequence information of the synchronizing timer memory 501 shown in FIG. 5 is referenced and the sequence information is acquired. (Step 703) The ON/OFF control of this status flag 502 is discussed below using FIGS. 9 and 10.

The control means 184 of the storage controller portion 112 shown in FIG. 2 write data contained in a write request to the cache memory 180. Because data with information added to identify the sequence is transferred in the case of copying to a copy destination site, it is possible to recognize the order in which the data should be written to the storage media in the copy destination site as well. The control means 184 controls the writing of data in the cache memory 180 to the disk devices 116. (Steps 704–705)

Following is a situation where the information storage devices 110 could not receive the sequence information from the master side sequencing means due to some fault (hereinafter a "sequence failed condition"). In this case, the status flag is ON. Generally this is a case where a master-switching factor for the sequencing means is detected. In Step 702, in the case where it is detected that the master switching factor status flag is ON, the information storage devices 110 carry out processing to turn back data for which writing was instructed to the information processing devices 101. At the same time, the information storage devices 110 switch to a state of not accepting the writing of data from the information processing devices 101. In other words, the information storage devices 110 issue reject notifications to the information processing devices 101. This is because the devices cannot accept data to which correct sequence information could not be added. (This state is hereinafter called the write data inflow denial state.) (Steps 707–708).

In the exchange on the SCSI I/F interface connecting the information processing devices 101 and information storage devices 110, the information storage device side continues to queue write requests from the information processing devices so long as the hardware resources allow. Therefore, in cases where it is necessary to switch the master side timer and standby side timer, the information storage devices 110 become able to deny the data write requests by not putting out notification to the effect that preparations to accept the data transfer are complete to the information processing devices 101.

The information storage device 110 that detected that the status flag is on and sustained the write data inflow denial state (hereinafter "rejection-issuing source information storage devices") makes a writing "notification to request the transition to a write data inflow rejection state" with respect to the information processing devices 101 ("master switching state notification") to each of the other information storage devices 110 constituting that information storage system 100. (Step 709)

The reject-issuing source information storage device 110 confirms that all of the other information storage devices 110 received the "notification to request the transition to a write data inflow rejection state" and issues a notification "to switch to master" to the standby side sequencing means. (Steps 711–712)

Here, the explanation concerns a constitution wherein the reject-issuing source information storage device 110 confirms a response signal from all of the information storage devices 110. However, another possible method is to connect the information storage devices 110 in a loop and make sequential notification to the adjacent information storage device 110. In this case, upon taking information issued by itself, a storage device determines that all of the information storage devices 110 have received that issuing. In this case, another possible constitution is one wherein an information storage device notifies information to both of the adjacent information storage devices 110, and determines that all of the information storage devices 110 have received that issuing upon first taking information issued by itself from either one.

Another possible constitution is one wherein the devices are connected in a star form and the notification is transferred sequentially to any of the information storage devices 110, and the information storage device 110, that detected that the status flag was on, determines that all of the information storage devices 110 have received that issuing upon taking information issued by itself.

The operation of the standby side sequencing means 140 in the case in FIG. 7 is explained next using the flowchart in FIG. 8.

First, it is determined whether the master switching notification was received by the standby side event receiving portion. (Step 801) When the master switching notification is received, master switching is performed. Specifically, the received notification is analyzed in the event analysis and processing portion shown in FIGS. 3 and 4. Information to the effect that it has become the master side is stored in the event analysis processing portion. More specifically, the defining means 137 established in the event analysis processing portion write information showing that this is the standby side sequencing means over information showing that this is the master side sequencing means.

In this case, the initial value of the sequence information (timing timer), provided to the sequencing means that have newly become the master, may be a value including the maximum time necessary for switching between master and standby added to the timer value of the original master side. As another method, the continuity of operation can be hoped for by providing, as the initial value, a timer value that can provide the sequence sufficiently later than the master side, to the standby side sequencing means in advance. Also, means can be employed wherein the latest values to become effective as writing sequence information input to each information storage device 110 are listed up, and new information (timer values) are provided, as the sequence according to the latest of those values, to the standby side sequencing means. (Step 802)

When the master switching process ends, the sequencing means 140 that has become the new master issues an "instruction to cancel the rejection state (master switching completion notification)" for the information processing devices 101 to the information storage devices 110 constituting the system. (Step 803)

Figure 9:
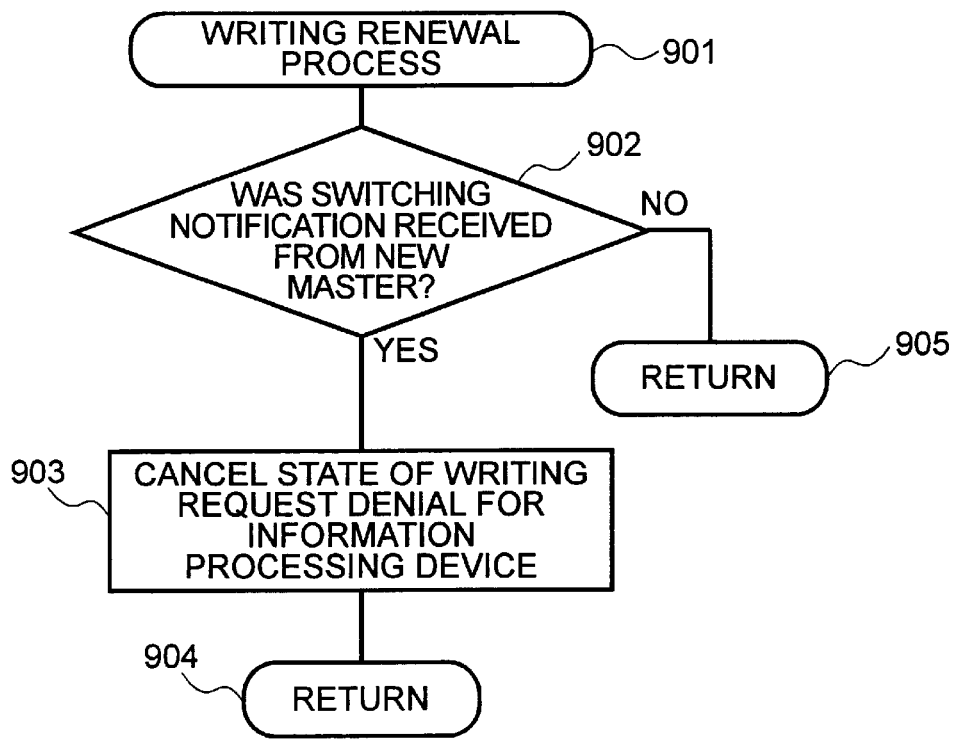
FIG. 9 is a flowchart showing the writing renewal process in accordance with embodiments of the present invention.

The processing by the information storage devices 110, in the case of having received an "instruction to perform reject cancellation (master switching complete notification)" from the new master side sequencing means 140, is explained using FIG. 9.

Upon receiving the notification that the master and standby switching is completed in Step 902, the information storage devices 110 cancel the write data inflow denial state rejection state for the information processing devices 101 and renew reception of write data requests. In this case, operation of the storage system becomes able to continue because an initial value which can provide sufficiently new sequence information is set for the sequence information provided by the sequencing means that have newly become the master, as explained in the explanation for Step 802 in FIG. 8. (Step 903)

This explanation used a method for serial notification of the notification to request transition to the write data inflow denial state ("master switching state notification"), and the confirmation of the reception thereof, and so forth, from the information storage device that has become the rejection source. However, these notifications can also be made by means for making notification with a broadcasting system through the standby side sequencing means 140 with which a communication route to each of the information storage devices 110 is ensured.

Figure 10:
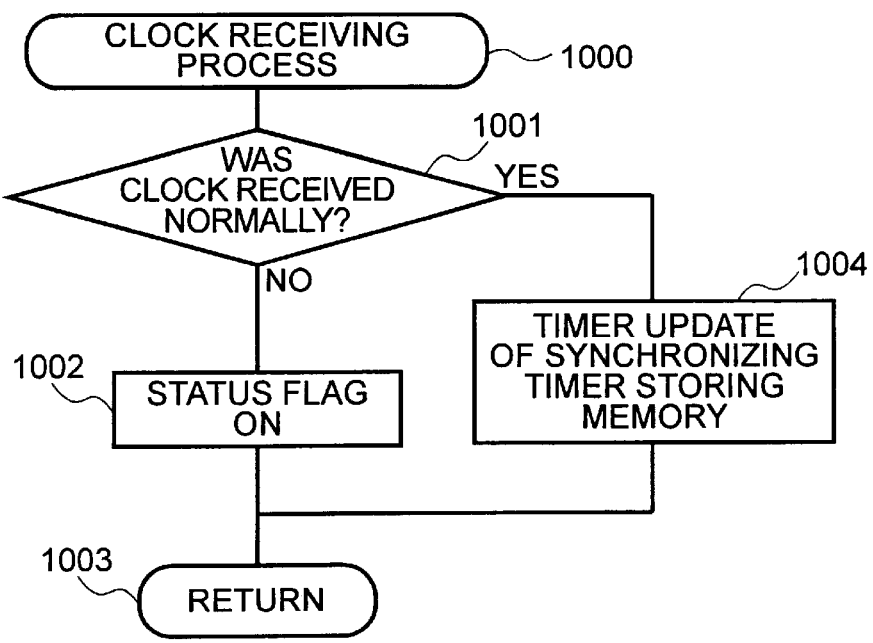
FIG. 10 is a flowchart showing the clock receiving process in accordance with embodiments of the present invention.

The reception of the synchronizing clock signal by the information storage devices 110 is explained using FIG. 10. With this status flag, it is determined whether a phenomenon has occurred such that the sequencing means 130 or information storage devices 110 cannot secure the sequence information, and those results are recorded in the prescribed memory. When the sequence information from the sequencing means 130 is received successfully by the information storage devices 110 and the counter value could be generated, the status flag 502 remains OFF. (Steps 1000, 1001, 1004)

Meanwhile, when the clock signal was not received successfully, the status flag 502 is set to ON. (Step 1002) In the procedures shown in FIG. 10, the explanation concerned only the situation wherein this status flag 502 is ON when the information storage device side could not successfully receive the sequence information. However, it is desirable to have a constitution such that the status flag is set to ON in the case where the correctness of the sequence information, currently distributed by the clock distributing portion itself, cannot be guaranteed.

Another embodiment of this invention is explained here. FIG. 11 shows the constitution of an information storage system wherein it is possible to carry out copying from the copy source site 100 to the copy destination site 200 as shown in FIG. 6. In this type of information storage system, when any type of fault occurs in the information processing devices or the like which are the copy source site host devices, it is desirable to switch between the copy destination site and copy source site. In this case, at least one set of sequencing means must be provided to each site. This because the site that becomes the copy source site must notify the copy destination site of the sequence information for write requests issued from the host devices in the copy source site. In FIG. 11, the timer devices 130 and 140 are connected to each of the sites respectively.

In FIG. 6, the master side timer device and the standby side timer device are connected to both sites for a redundant constitution, but in FIG. 11, one timer device is established in each site; the timer device of the copy source site is defined as the master side sequencing means 130, and the timer device on the copy destination site side is defined as the standby side sequencing means 230.

Figure 12:
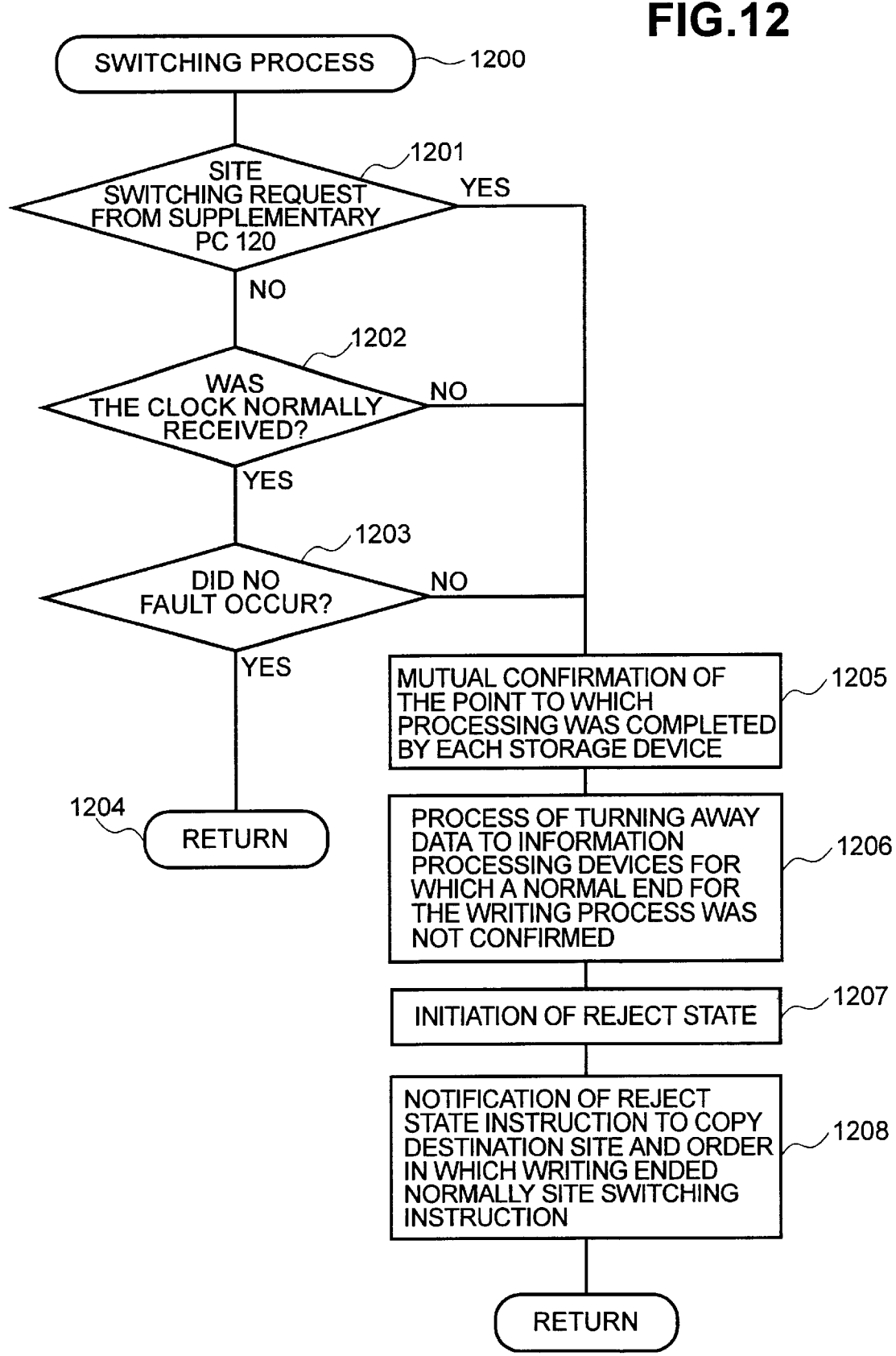
FIG. 12 is a flowchart showing one example of the site switching process in accordance with embodiments of the present invention.

A procedure for performing site switching of the copy destination site 200 to the new copy source site in the information storage system shown in FIG. 11 is explained using the flowchart in FIG. 12. Cases where the necessity for carrying out this site switching arises include the case where some fault has occurred in any of the information processing devices 101, sequencing means, or information storage devices 110 constituting the copy source site; or the case where it is necessary to use the copy destination site 200 as the new copy source site from the perspective of maintenance management.

The host devices 101 periodically monitor whether a phenomenon has occurred to trigger site switching. For example, the host devices sequentially monitor whether a site switching request has been made from the supplementary PC 120 (Step 1201), whether the clock necessary for sequence information generation was received successfully (Step 1202), whether a failure has occurred in any of the devices in the system (Step 1203), or the like. The processing ends when any of these situations is not recognized.

In the case where some failure or a switching instruction from the supplementary PC 120 is detected with this monitoring, a failover instruction from all of the information processing devices 101 becomes necessary. All of the information processing devices 101 carry out an operation to match their awareness to carry out a failover through the public switched network 310. Specifically, on the basis of the sequence information for the data, the information storage devices 110 mutually recognize how far the write requests from the information processing devices 101 were processed and report this information to the information processing devices 101. Specifically, the information processing devices confirm the point up to which the writing processing ended successfully. (Step 1205)

Furthermore, when necessary, the information storage devices 110 are notified to carry out a data turning away process for turning away writing data, for which is given the sequence for data following that for which it was confirmed that writing ended successfully in Step 1205, to the information processing devices 101. (Steps 1206, 1207)

Furthermore, notification to stop the writing of data, to become the sequence for data following that for which writing completed successfully in the copy source site, is sent to the copy destination site information storage devices 210 in the same way. (Step 1208)

Figure 13:
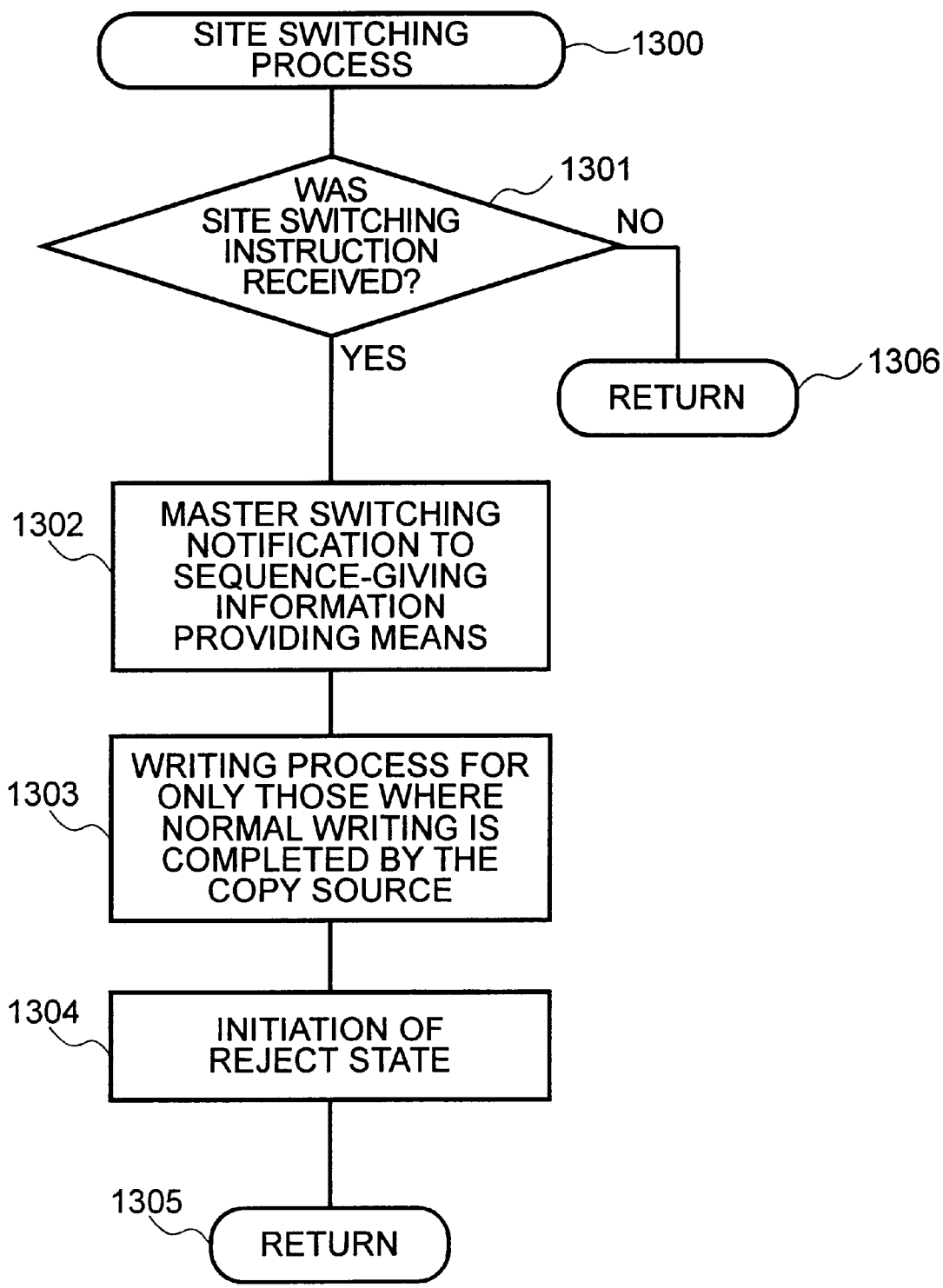
FIG. 13 is a flowchart showing one example of the site switching process in accordance with embodiments of the present invention.

In the case of site switching because of detecting a fault, as necessary, the detection of the device where the fault occurred, and the degeneration and blocking off of that device are carried out before the instruction for site switching is issued from the host devices in Step 1208. Meanwhile, in the case of receiving the site switching order in Step 1208 in FIG. 12 as discussed above, the information storage devices 210 of the copy destination site 200 immediately notify the timer device 230, which is the sequencing means within its own site, to become the master. This state is explained using the flowchart in FIG. 13.

Upon receiving the site switching instruction, the copy destination site information storage devices instruct the sequencing means 230 at that site to become the master side sequencing means. (Step 1301)

Furthermore, as necessary, information not to accept write requests from the information processing devices 201, which are the host devices, is sustained except when writing up to the writing data for which writing completed successfully in the copy source site. (1303, 1304) The constitution can thereby be such that, even after the site switching order from the host devices is issued, writing is not initiated until the preparation of the timer device to provide the sequence information is complete.

Figure 8:
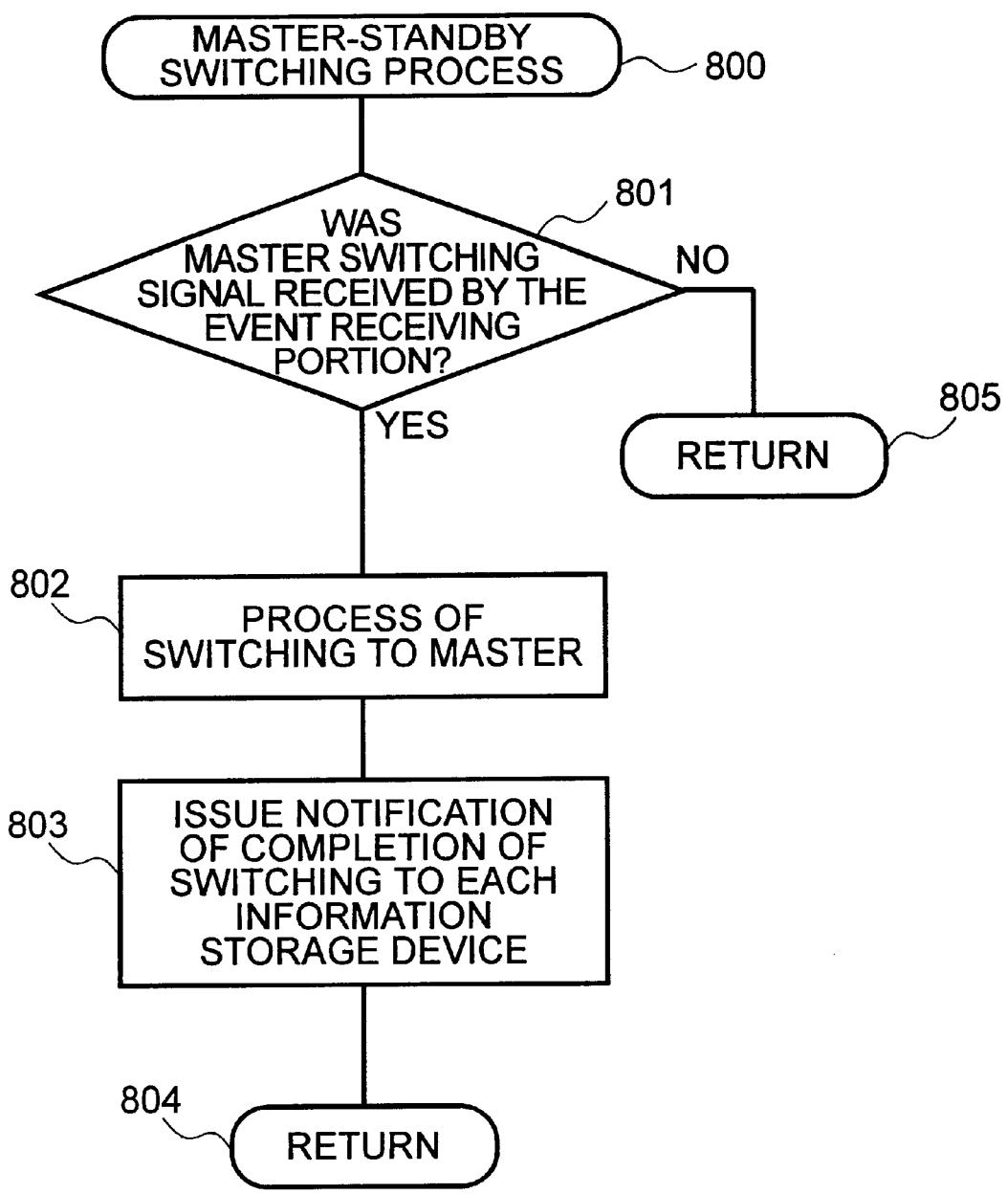
FIG. 8 is a flowchart showing the switching process between the master side means for providing sequence information and the standby side means for providing sequence information in accordance with embodiments of the present invention.

The timer device 230 performs the master switching process with the same procedures as the procedures shown in FIG. 8. The timer device 230 notifies the other storage devices 210, constituting the same information storage system 200, that the switching process is complete once the process of switching to master ends.

Furthermore, like in the writing renewal process shown in FIG. 9, each of the information storage devices 210 gets writing data from the information processing devices 201, while as the new copy source site 200, each initiates asynchronous copying to send information, which is provided the writing sequence information, to the new copy destination site 100.

In this system, in the case where a state in which site switching should be performed occurs, the state of rejecting the reception of data is sustained until the preparation of the sequencing means is arranged. The new copy source and copy destination receive the instruction to cancel the rejection of data reception from the sequencing means that have newly become the master and renew operation. It thereby becomes possible to carry out data transfer to the new copy destination site in a state where the addition of sequence information is certain.

This explanation here has been made, focusing on the information storage devices 110 and the sequencing means. More specifically, however, a failover instruction from all of the information processing means 101 becomes necessary when site switching is performed. This is because, for site switching, it is necessary to delete the remote copy pair once because of the substitution of a duplicate of the remote copy pair from the information processing devices 101. For this reason, it becomes necessary, needless to say, for maintaining the identity of the data to have procedures such as information exchange regarding the time up to which writing completed successfully between the information processing devices 101 and information storage devices 110, and between the information processing devices 201 and information storage devices 210.

As discussed above, an information storage system which can withstand faults can be provided by having a redundant constitution of sequencing means, for providing the order of reception of write information used when carrying out remote copying, in an information storage system wherein the copy source site or copy destination site is constituted with one or more information storage devices.

Meanwhile, in the case where this type of copy source and copy destination site are each comprised of a plurality of storage systems, site switching for switching the copy source site and copy destination site is made possible because of the establishment of sequencing means in the copy destination site as well. The resources of the copy destination site can also thereby be effectively put to practical use. Furthermore, providing a redundant constitution with the sequencing means of the copy source site and copy destination site reduces the initial investment in the information storage system, while making it possible to provide a storage system having a highly available remote copy function. In the specification for remote copying, wherein the copy source site and copy destination site comprise a plurality of information storage devices as in this application, as the operation for site switching in particular, all pairs are suspended just by the occurrence of a timer fault in the case where there is no redundant constitution of timers in each site. On the other hand, the effects of very high system stability are attained in the present invention where the timer portion has a redundant constitution.

Also, because the trigger for renewing copying is the completion switching the timer devices for distributing the sequence information to the new master side, it becomes possible, when site switching, to provide the sequence information to the information storage system that has become the new copy source.

Also, sequencing means that can respond to high-speed I/O requests from host devices can be constituted by a technique of correcting sequence information attained with a self-advancing timer of the internal processors of the information storage devices with information from the sequencing means.

What is claimed is:

1. An information storage system comprising:
    a plurality of information storage devices, each receiving write requests from one or more host devices;
    a first sequence generator configured to produce first sequence information; and
    a second sequence generator configured to produce second sequence information, said first and second sequence generators operating independently of each other,
    said information storage devices coupled to said first and second sequence generators wherein for each of said information storage devices, an ordering of write requests received by said each information storage device can be established based on either said first sequence information or said second sequence information.

2. The information storage system of claim 1 further comprising defining means to define said first sequence generator as a master sequencer, wherein said ordering of write requests can be established by said information storage devices based on sequence information generated by said master sequencer.

3. The information storage system of claim 2 further comprising means for determining a sequence failed condition, said information storage devices, in response to detecting said sequence failed condition, do not perform write operations for said write requests.

4. The information storage system of claim 3 wherein said second sequence generator is configured to notify said information storage devices to resume performing said write operations upon receiving said second information.

5. The information storage system of claim 2 further comprising means for determining a sequence failed condition, said defining means, in response to detecting said sequence failed condition, defining said second sequence generator as said master sequencer.

6. The information storage system of claim 5 further comprising means for determining a sequence failed condition, said information storage devices, in response to detecting said sequence failed condition, do not perform write operations to store data associated with said write requests.

7. The information storage system of claim 6 wherein said second sequence generator is configured to notify said information storage devices to resume performing said write operations upon receiving said second information.

8. The information storage system of claim 6 wherein said information storage devices are further responsive to said sequence failed condition by communicating an indication of said sequence failed condition to others of said information storage devices.

9. The information storage system of claim 8 wherein said communication is made in serial fashion among said information storage devices.

10. The information storage system of claim 8 wherein said second sequence generator is configured to notify said information storage devices to resume performing said write operations upon receiving said second information.

11. An information storage system including a plurality of information storage devices for receiving write requests from a plurality of host devices and for controlling storage media write operations of data associated with said write requests, the information storage system comprising:
    first means for generating sequence information connected with said information storage devices, said sequence information effective for establishing a sequence order in which write requests are received from said information processing devices,
    wherein said first means for generating comprises:
        a processing portion; and
        a clock receiving portion for receiving an external clock signal,
        said processing portion operatively coupled to perform an adjustment of said external clock signal, said adjustment producing adjusted clock values based on a distance between said sequencing means and said plurality of information storage devices,
    wherein said sequence information comprises said adjusted clock values, thereby compensating said sequence information for timing differences due to long distance separation among said information storage devices.

12. A remote information storage system comprising:
    a plurality of first storage devices configured to receive write requests from a plurality of first host devices;
    a plurality of second storage devices configured to receive write requests from a plurality of second host devices;
    a first sequence generator operatively coupled to said first storage devices to provide sequence information;
    a second sequence generator operatively coupled to said second storage devices to provide sequence information; and
    a bi-directional communication channel between said first storage devices and second storage devices, said first and second storage devices being selectively configurable to operate in a first operating configuration wherein write requests received by said first storage devices are copied to said second storage devices and to operate in a second operating configuration wherein write requests received by said second storage devices are copied to said first storage devices, said first sequence generator configured to operate as a master sequencer when said first and second storage devices operate in said first operating configuration, said second sequence generator configured to operate as said master sequencer when said first and second storage devices are configured for said second operating configuration.

13. The information storage system of claim 12 further including a detector to detect when sequence information from said first sequence generator is not successfully produced, and in response thereto said second sequence generator thereafter providing said sequence information.

14. The information storage system of claim 13 wherein each of said first and second sequence generators comprises a processor for computing an adjusted time value based on distances between said first and second sequence generators and said first and second information storage devices.

15. An information storage device connected to a plurality of host devices comprising:

a plurality of recording media; and storage control means for receiving write requests from said host devices and for controlling write operations to said recording media of data associated with said write requests, said storage control means comprising:
a first memory for acquiring external sequence information from a source external to said information storage device and for storing information for producing a sequence order of said write requests received from said host devices;
a second memory for storing whether said external sequence information was acquired successfully; and
detect means, coupled to said second memory, for detecting a sequence failed condition based on contents of said second memory, wherein a write data inflow denial state is established when said sequence failed condition is detected.

16. In an information storage system comprising a plurality of storage devices, a sequence generator for providing sequence information to establish a sequence order of write requests received from a plurality host devices comprising:

a clock receiving portion for receiving an external clock signal;

an analysis processing portion for generating said sequence information on the basis of said external clock signal; and an output portion configured to communicate said sequence information to said information storage devices.

17. The information storage system of claim 16, wherein said analysis processing portion includes a time adjustment skew output produced on the basis of a distance between said information storage devices and said sequence generator.

18. An information storage device configured to receive write requests from a plurality of host devices comprising:

a plurality of recording media;

storage control means for receiving said write requests and for controlling data write operations to said recording media; and a sequence processor for producing sequence information within said information storage device, said sequence processor cooperative with said storage control means to associate said sequence information with said write requests, said sequence processor comprising:
a clock;
a self-advancing timer which is counted by said clock to produce timer values; and
a local memory coupled to store said timer values, said sequence processor configured to receive external sequence information from a source external to said information storage device and to adjust said timer value based on said external sequence information.

19. A control method for an information storage system, said information storage system comprising a plurality of information storage devices which receive write requests issued by a plurality of host devices, said information storage devices performing write operations in response to said write requests to store data associated with said write requests, the method comprising:

receiving sequence information from a first sequence generator;

determining whether said sequence information received from said first sequence generator is usable;

if it is determined that said sequence information is not usable, then
switching said information storage devices to an operating state wherein said write operations are not performed for said write requests;
notifying a second sequence generator to provide sequence information; and
receiving notification at said information storage devices from said second sequence generator to resume said write operations, wherein sequence order determination of said write operations is made based on sequence information obtained from said second sequence generator.

20. The method of claim 19 wherein said switching step includes sending in serial fashion, from a first of said information storage devices to the other information storage devices, an indication to perform a switching step.

21. The method of claim 19 wherein said switching step includes sending in broadcast fashion, from a first of said information storage devices to the other information storage devices, an indication to perform a switching step.

* * * * *